Figure 1:
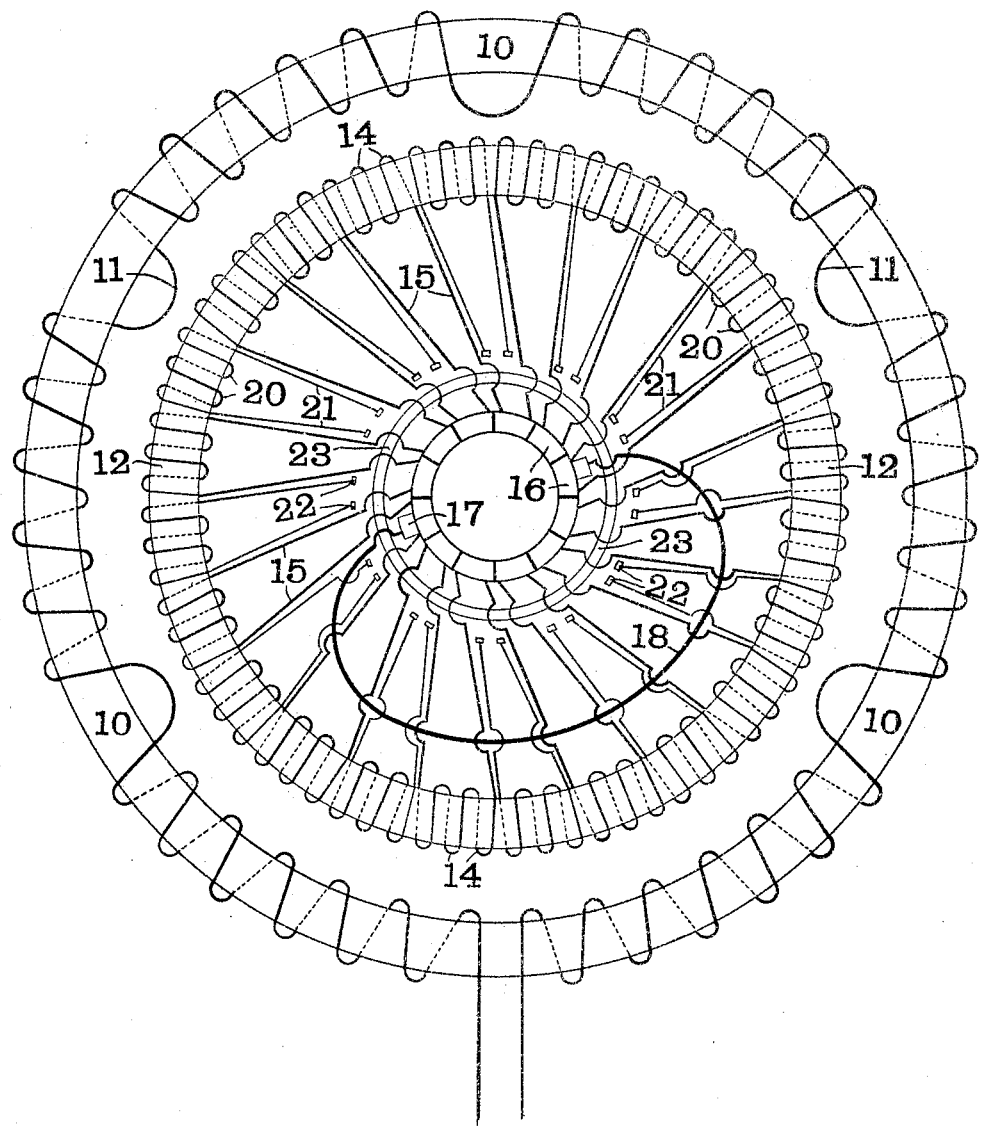

No. 778,400. PATENTED DEC. 27, 1904.
J. H. BRYSON.
ELECTRIC MOTOR.
APPLICATION FILED APR. 21, 1904.

2 SHEETS—SHEET 1.

Witnesses
L. B. Beach
Fred Henke

Inventor
James H. Bryson.
By Attorneys

No. 778,400. PATENTED DEC. 27, 1904.
J. H. BRYSON.
ELECTRIC MOTOR.
APPLICATION FILED APR. 21, 1904.
2 SHEETS—SHEET 2.
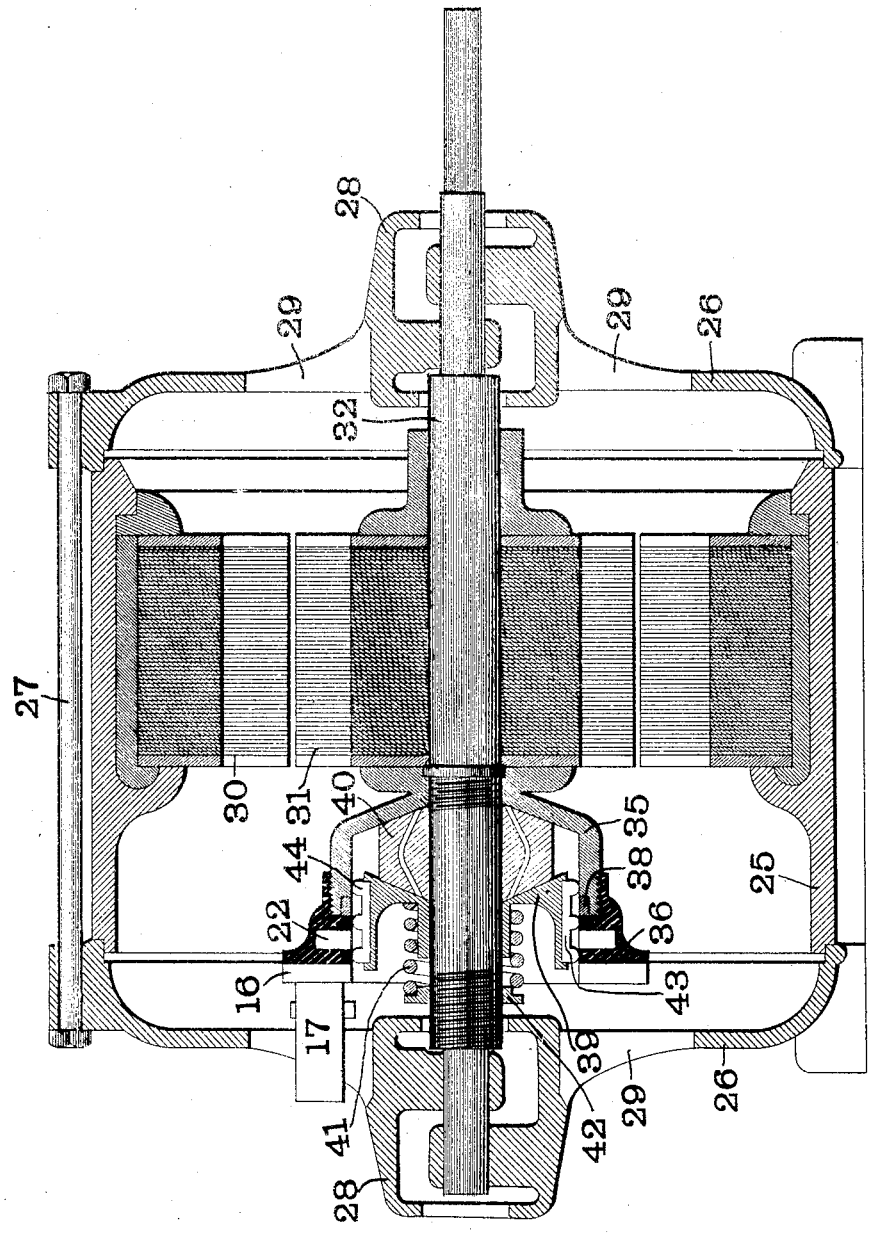
Witnesses
L. B. Beach
Fred Henkel
Inventor
James H. Bryson.
By Attorneys No. 778,400.

Patented December 27, 1904.

UNITED STATES PATENT OFFICE.

JAMES H. BRYSON, OF ST. LOUIS, MISSOURI, ASSIGNOR TO WAGNER ELECTRIC MANUFACTURING COMPANY, OF ST. LOUIS, MISSOURI, A CORPORATION OF MISSOURI.

ELECTRIC MOTOR.

SPECIFICATION forming part of Letters Patent No. 778,400, dated December 27, 1904.

Application filed April 21, 1904. Serial No. 204,186.

*To all whom it may concern:*

Be it known that I, JAMES H. BRYSON, a citizen of the United States, residing at the city of St. Louis, in the State of Missouri, have invented a certain new and useful Electric Motor, of which the following is such a full, clear, and exact description as will enable any one skilled in the art to which it appertains to make and use the same, reference being had to the accompanying drawings, forming part of this specification.

My invention relates more particularly to alternating-current motors, and has for its object to secure a motor of large load capacity, which at the same time requires but a small starting-current. For this purpose I exclude from active operation at starting a portion of the armature-circuits, and thus obtain by decreasing the amount of copper in circuit a higher resistance in the armature, cutting down the starting-current. After the motor has started and preferably after it has attained normal running speed the armature resistance is reduced by cutting, preferably automatically, additional copper into circuit, thus obtaining a motor of increased load-carrying capacity. At the same time that the additional circuits are cut in the circuit upon which the motor has started is automatically reorganized.

In the drawings, in which like characters refer to similar parts in the different views, Figure 1 is a diagram of the circuits of one form of motor embodying my invention, and Fig. 2 is a vertical longitudinal section of a motor embodying means for changing the circuits or connections of the armature.

Referring first to Fig. 1, 10 indicates the field-core, 11 the field-winding, and 12 the armature-core. The armature is provided with two circuits or windings. The first winding is indicated by 14 and is connected by means of leads 15 with the segments 16 of a commutator upon which bear brushes 17. These brushes are placed on a locally-closed circuit by means of a conductor 18, connecting them. The second winding or circuit of the armature is interspersed between the sections of the winding 14 above described and is indicated at 20. Each section of this winding 20 is connected by leads 21 with contact-plates 22. 23 is a ring of conducting material which is adapted to be clamped against the commutator-segments 16 and the contact-plates 22 simultaneously by the automatic mechanism hereinafter described.

It is evident that when the conducting-ring 23 is out of contact with the commutator 16 and the contact-plates 22, as shown in the drawing of Fig. 1, and the brushes are upon the commutator, as also shown in that figure, the brushes will act when current is supplied to the field-winding 11 to fix the poles of the armature and to start the motor in the manner already familiar to the art in single-phase self-starting motors. In this condition the winding 14, connected to the commutator, has its currents commuted through the brushes 17 and commutator 18; but the various sections of the circuit or winding 20 are on open circuit and inoperative. Thus only a portion of the armature-winding is in circuit and the resistance of the armature is high, cutting down the starting-current. After the motor has started, however, and the conducting-ring 23 is automatically brought into contact, as hereinafter described, with the commutator-segments 16 and the contact-plates 22 the sections of the winding 20 become operative, current flowing therein by induction and adding to the load-carrying capacity of the motor. At the same time the segments 16 are electrically connected together, thus short-circuiting the armature-winding 14 and to all intents and purposes excluding the brushes 17 and the conductor 18 from the circuit.

In Fig. 2 is shown the automatic centrifugal device which moves the conducting-ring 23 into contact with the commutator-segments 16 and contact-plates 22 after the motor has started and when it attains normal running speed under load. This device is a modification of that shown and described in United States Letters Patent to J. H. Blair, granted October 27, 1903, No. 742,280. As here shown, the motor-case consists of three parts, a middle portion 25 and end pieces 26, which are fastened together by through-bolts 27. The end pieces 26 are provided with suitable boxes 28, and ventilating-openings are formed at 29 by cutting said end pieces away. The stationary member or field 30 of the motor corresponding to 10 in Fig. 1 is fastened to the inside of the motor-casing, as is usual in motors of this type. The rotary member or armature 31 of the motor corresponding to the part numbered 12 in Fig. 1 is rigidly mounted upon a shaft 32, journaled in the boxes 28. All of these parts are of usual and well-known construction and are therefore not particularly described herein. Screwed upon the shaft 32 and adapted to rotate therewith is a cup-shaped casting 35, which carries upon its rim the commutator-segments 16 and the contact-plates 22, described in connection with Fig. 1. 36 is an insulating-ring screwed upon the casting 35 and to which the segments 16 and plates 22 are secured, as shown in the drawings. In Fig. 2 but two of the segments and two of the plates 22 are shown. It will be understood, however, that, as usual, there are a large number of these plates and segments distributed around the insulation 36 in the form of rings. The brushes 17 bear upon the outer surface of the segments 16. A continuous conducting-ring 38 is carried at the rim of the cup-shaped casting 35. 39 is an annular member surrounding the shaft 32. The inner face of this member is beveled or inclined, and the cup-shaped casting 35 is provided with an opposing face also beveled or inclined, but in the opposite direction. Between these two inclined faces are segmental pieces 40. These are loosely mounted upon the shaft 32, but adapted to rotate therewith. These parts 40 are made of soft composition metal. 41 is a spring abutting against a collar 42 upon the shaft 32. The other end of this spring abuts against the annular number 39 and holds the parts in the position shown in Fig. 2 when the motor is at rest or below normal running speed. 43 represents conducting contact-pieces loosely carried in a groove in the outer surface of the annular member 39. But two of these contact-pieces 43 are shown in Fig. 2, but it will be understood that a large number of them are distributed around the member 39 to form a continuous ring. A certain amount of play or free motion is allowed these contact-pieces 43 between the bottom of the groove and the parts against which their rubbing-surfaces are adapted to bear. These contacts 43 and the ring 38 correspond to the conducting-ring 23, described in connection with Fig. 1 and act to electrically connect together the various commutator-segments 16 and contact-plates 22 to short circuit the winding 14 and close the winding 20. It will be seen that the contact-pieces 43 are each provided with three projecting shoulders 44. The inner one of these shoulders rests, when the device is in the position shown in Fig. 2, upon the casting 35 and the other two shoulders upon the insulation 36, thus leaving the segments 16 and the contact-plates 22 insulated from one another and from the ring 38. When, however, the motor has attained normal running speed, the centrifugal force generated will move the segmental pieces 40 outward, thus actuating the member 39 against the resistance of the spring 41 until the shoulders 44 on the contact-pieces 43 connect with the various segments 16 and contact-plates 22, thus short circuiting the commutator-segments and rendering the winding 20 operative by connecting its open ends. It will be evident from this that the circuit upon which the motor is started continues operative, but in a reorganized and uncommuted condition, after the motor has reached normal speed and that owing to the fact that after the motor has started the commuted winding is short-circuited, and thus broken up into a number of small circuits, and at the same time additional short circuits are placed in service by the closing of that winding, which was inoperative at starting, I produce a motor of large load-carrying capacity and low-starting current. It will of course be understood that when the energizing-current is excluded from the field the armature speed gradually decreases until the spring 41 forces the member 39 inward, thus opening the winding 20 and placing the brushes 17 again in circuit, so that when the armature comes to rest the motor is again in starting condition.

Having fully described my invention, what I claim as new, and desire to secure by Letters Patent of the United States, is—

1. In a motor, a member having a circuit locally closed and operative at starting, a second circuit for said member inoperative at starting, and means for rendering said second circuit operative and for short-circuiting said first-named circuit after said motor has started.

2. In a motor, a member having a circuit operative at starting, a second circuit for said member inoperative at starting, and automatic means for simultaneously rendering said second circuit operative and for short-circuiting said first-named circuit after said motor has started.

3. In a motor, a member having a circuit locally closed and operative at starting, a second circuit for said member inoperative at starting, and automatic means for simultaneously rendering said second circuit operative and for short-circuiting said first-named circuit after said motor has started.

4. In an electric motor, a member having a locally-closed circuit commuted at starting, a second circuit for said member inoperative at starting, and means for rendering said second circuit operative and for short-circuiting said commuted circuit after said motor has started.

5. In an electric motor, a member having a circuit commuted at starting, a second circuit for said member inoperative at starting, and automatic means for simultaneously rendering said second circuit operative and for short-circuiting said commuted circuit after the motor has started.

6. In an electric motor, a member having a circuit commuted at starting, a second circuit for said member inoperative at starting, and automatic means for simultaneously rendering said second circuit operative and short-circuiting the commutator-segments after said motor has started.

7. In an electric motor, a member having a locally-closed circuit commuted at starting, a second circuit for said member inoperative at starting, and means for rendering said second circuit operative and for short-circuiting the commutator after the motor is started.

In testimony whereof I have hereunto set my hand and affixed my seal in the presence of the two subscribing witnesses.

JAMES H. BRYSON. [L. S.]

Witnesses:
 D. C. BETJEMAN,
 FRED HENKE.